(12) United States Patent
Hotta et al.

(10) Patent No.: US 8,213,286 B2
(45) Date of Patent: Jul. 3, 2012

(54) PHOTODETECTOR AND OPTICAL PICKUP APPARATUS INCLUDING THE SAME

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 535 days.

(21) Appl. No.: 12/182,098

(22) Filed: Jul. 29, 2008

(65) Prior Publication Data

US 2009/0034392 A1    Feb. 5, 2009

(30) Foreign Application Priority Data

Jul. 30, 2007 (JP) .................................. 2007-196924
Jul. 17, 2008 (JP) .................................. 2008-185517

(51) Int. Cl.
*G11B 7/00* (2006.01)

(52) U.S. Cl. ........................................................ 369/100

(58) Field of Classification Search .................... 369/100
See application file for complete search history.

(56) References Cited

U.S. PATENT DOCUMENTS

| 4,661,944 | A | * | 4/1987 | Van Sluys | 369/44.23 |
| 4,909,910 | A | * | 3/1990 | Morin | 205/138 |
| 7,154,838 | B2 | * | 12/2006 | Kamei et al. | 369/112.08 |
| 7,158,469 | B2 | * | 1/2007 | Aikoh et al. | 369/120 |
| 7,649,035 | B2 | * | 1/2010 | Taima | 523/220 |
| 7,820,959 | B2 | * | 10/2010 | Kawasaki et al. | 250/239 |
| 2008/0054157 | A1 | * | 3/2008 | Kawasaki et al. | 250/201.5 |

FOREIGN PATENT DOCUMENTS

| JP | 63-000830 | | 1/1998 |
| JP | 10-229206 | * | 8/1998 |
| JP | 2005-259793 | * | 9/2005 |

OTHER PUBLICATIONS

MAT (machine assisted translation) of JP 2005-259793.*
MAT (Machine assisted translation) of JP 10-229206.*

* cited by examiner

*Primary Examiner* — Aristotelis Psitos
(74) *Attorney, Agent, or Firm* — Fish & Richardson P.C.

(57) ABSTRACT

A photodetector comprising: a substrate; a photodiode fixed to the substrate, the photodiode configured to output a signal according to a light amount of a laser beam when applied with the laser beam; and a translucent resin covering the photodiode, the translucent resin being irradiated with ultraviolet light in advance for a predetermined time such that a change in transmittance of the translucent resin for the laser beam having a predetermined wavelength is set within a predetermined range.

2 Claims, 5 Drawing Sheets

PHOTODETECTOR AND OPTICAL PICKUP APPARATUS INCLUDING THE SAME

CROSS-REFERENCE TO RELATED APPLICATIONS

This application claims the benefit of priority to Japanese Patent Application Nos. 2007-196924 and 2008-185517, filed Jul. 30, 2007 and Jul. 17, 2008, respectively, of which full contents are incorporated herein by reference.

BACKGROUND OF THE INVENTION

1. Field of the Invention

The present invention relates to a photodetector included to be used in an optical pickup apparatus performing an operation for reading signals recorded in an optical disc and an operation for recording signals into an optical disc and the optical pickup apparatus including the photodetector.

2. Description of the Related Art

Optical disc apparatuses are widely used, which apply laser beams emitted from optical pickup apparatuses to signal recording layers of optical discs to perform signal reading operations and signal recording operations.

While are generally used optical disc apparatuses using optical discs called CD or DVD, there are recently developed optical disc apparatuses using optical discs having improved recording densities, i.e., optical discs of the Blu-ray standard or HD DVD (High-Definition Digital Versatile Disc) standard.

Infrared light with a wavelength of 780 nm is used as the laser beam for the operation of reading signals recorded in a CD-standard optical disc, and red light with a wavelength of 650 nm is used as the laser beam for the operation of reading signals recorded in a DVD-standard optical disc.

The laser beam with a shorter wave length, for example, blue-violet light with a wavelength of 405 nm is used as the laser beam for the operation of reading signals recorded in the Blu-ray standard or HD-DVD standard optical discs, as compared to the laser beam for the operation of reading signals recorded in the CD-standard or DVD-standard optical discs.

A protective layer disposed on a top surface of the signal recording layer of the Blu-ray standard optical discs has a thickness of 0.1 mm, and a numerical aperture of an objective lens used for the signal reading operation from the signal recording layer is set to the specified value of 0.85.

On the other hand, a protective layer disposed on the top surface of the signal recording layer of the HD-DVD standard optical discs has a thickness of 0.6 mm, and a numerical aperture of the objective lens used for the signal reading operation from the signal recording layer is set to the specified value of 0.65.

Since the blue-violet light with a wavelength of 405 nm can be used as the laser beam for the operation of reading signals recorded in the Blu-ray standard or HD-DVD standard optical discs, as above, there can be produced an optical pickup apparatus that can perform the operation of reading signals from optical discs of both standards by sharing a laser diode.

The optical pickup apparatus is configured such that a drive current to be supplied to the laser diode can be controlled to obtain an laser output suitable for reading signals recorded in the optical disc or to obtain the laser output suitable for recording signals into the optical disc.

The optical pickup apparatus is configured so as to be able to perform a control operation for focusing the laser beam emitted from the optical pickup apparatus, as a spot, onto the signal recording layer of the optical disc, i.e., a focusing control operation, and performing a control operation for causing the spot of the laser beam to follow a signal track, i.e., a tracking control operation.

In the optical pickup apparatus, a photodetector is included as a means for performing the laser output control operation, the focusing control operation, and the tracking control operation as described above. The photodetector is generally configured such that a light-receiving element such as a photodiode is covered with a translucent resin (see Japanese Patent Application Laid-Open Publication No. Sho 63-000830).

Figure 7:
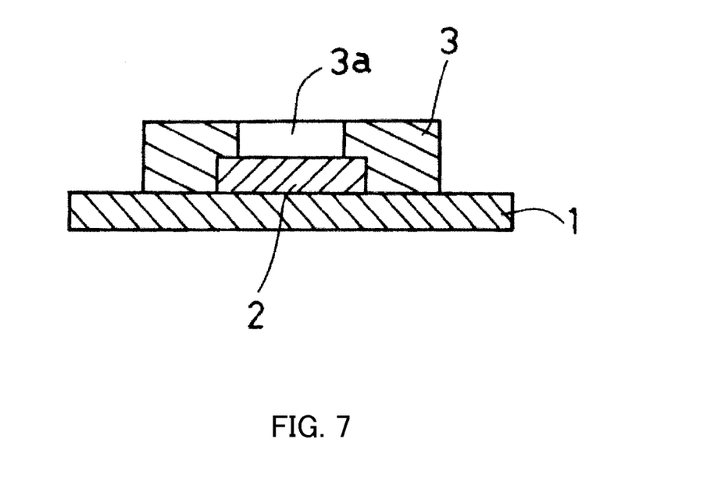
FIG. 7 is a cross-sectional view of an example of a photodetector.
Figure 8:
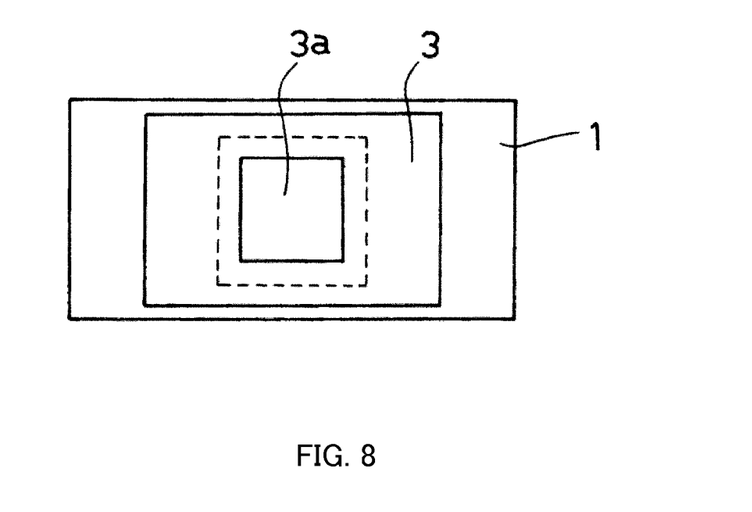
FIG. 8 is a plain view of an example of a photodetector.

The photodetector included in the optical pickup apparatus will be described with reference to FIGS. 7 and 8. FIGS. 7 and 8 are a cross-sectional view and a plain view, respectively, of the photodetector. A photodiode 2 for outputting a signal according to a light amount of a received laser beam is fixed on a substrate 1, and the photodiode 2 is covered with a translucent resin 3 having high transmittance for laser beam having a wavelength to be used. Signals generated by the photodiode 2 are picked up through bonded wires, and such wires are fixed and protected generally by the translucent resin 3.

While the laser be amused for the DVD optical discs, i.e., a red laser beam, has a wavelength of 650 nm, the laser beam used for the Blu-ray standard and HD-DVD standard optical discs, i.e., a blue-violet laser beam, has a shorter wavelength of 405 nm.

A relationship between energy and wavelength of a laser beam can be represented by $E = h\nu = h \times c/\lambda$, where E is energy; h is Planck's constant; $\nu$ is frequency; c is velocity of light; and $\lambda$ is wavelength. From this relational expression, such a characteristic is clear that light energy is increased as a laser-beam wavelength is reduced.

In the optical pickup apparatus including a laser diode emitting a laser beam, the laser output control operation, the focus control operation, etc., are performed with using a signal obtained from the photodetector, and the laser-beam light amount detection operation by the photodetector is performed based on the laser beam applied through the translucent resin 3 covering the photodiode 2.

Although an epoxy resin is generally used as a material of the translucent resin 3 in consideration of performance and cost, when using resin, transmittance is deteriorated due to a photochemical reaction, and thus, unfortunately the laser-beam light amount detection operation cannot be performed with accuracy.

Although a method of forming a through-hole 3a on an laser-beam incident surface of the photodiode 2 as shown in FIGS. 7 and 8 is employed as a method of solving the above problem, since the hole is required to be formed with accuracy in an area through which the beam of laser light passes, a forming processing unit cost is increased, which is a problem.

In order to reduce the forming processing unit cost, there is employed a photodetector having a configuration without the through-hole 3a formed on the laser-beam incident surface by using resin with higher transmittance as the translucent resin.

The translucent resin covering the photodiode has a property that transmission characteristics are changed corresponding to a wavelength of a laser beam to be used. For example, if a synthetic resin material used for an objective lens for focusing the laser beam corresponding to the DVD standard, i.e., red laser beam with a wavelength of 650 nm, is used to produce an objective lens for focusing the laser beam corresponding to the Blu-ray standard and the HD-DVD standard, i.e., the blue-violet laser beam with a wavelength of 405 nm, the transmittance of the objective lens is considerably reduced by the blue-violet laser beam.

Figure 6:
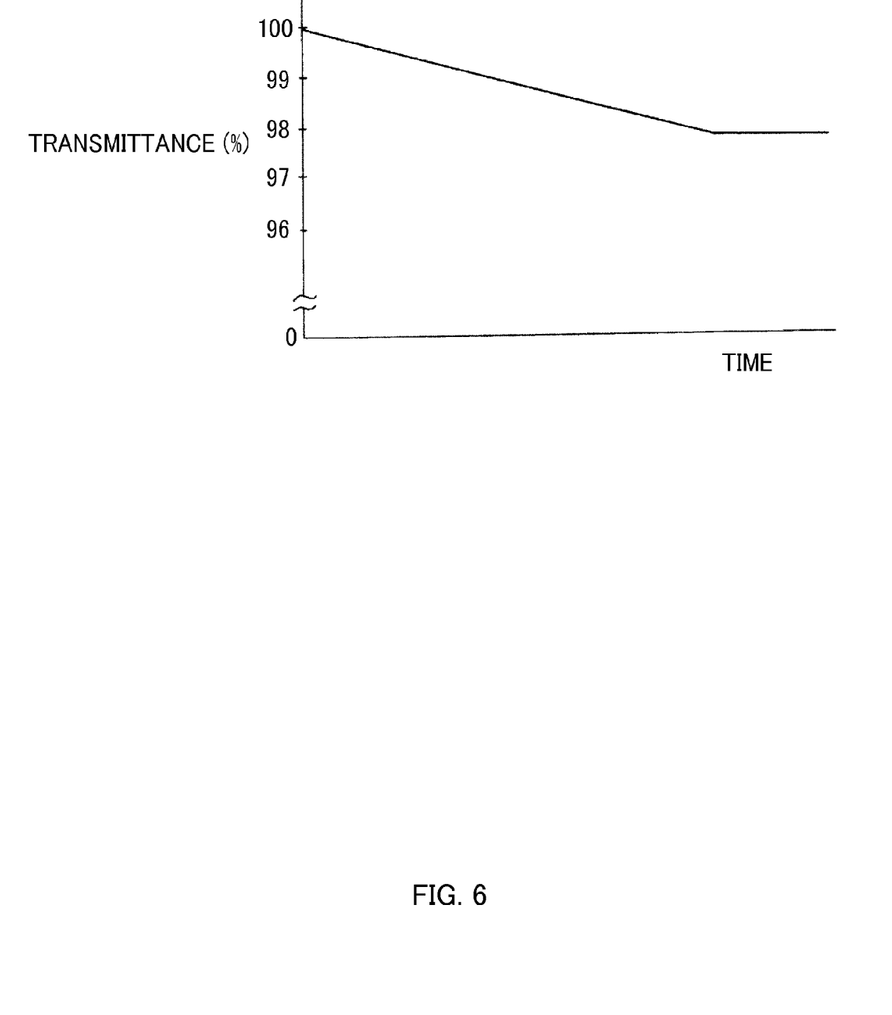
FIG. 6 is a characteristic view showing a relationship between transmittance of a translucent resin and irradiation time in a photodetector.

FIG. 6 is a characteristic view of a change in the transmittance of the translucent resin for the blue-violet laser beam with time in the case of using the synthetic resin material having characteristics suitable for the red laser beam such as the synthetic resin material called APEL 5014DP of Mitsui Chemicals, inc., as the translucent resin. It is experimentally confirmed that the transmittance is reduced by 2% or more in the case where the blue-violet laser beam with a wavelength of 405 nm is applied for 1000 hours. If the transmittance of the translucent resin covering the photodiode is reduced as above, the intensity of the laser beam applied to the photodiode is reduced, and thus, detection characteristics as a photodetector are deteriorated.

The translucent resin is specified to be set, as an usable resin standard, such that the degree of change in transmittance is within a range of 2% in the case where the laser light is applied thereto for 1000 hours, for example, and if the degree of change in the transmittance is out of specification, a level of an output signal corresponding to intensity of the laser light applied to the photodetector becomes out of permissible range.

In solving such a problem, there is a method of using the synthetic resin which is not affected by the blue-violet laser beam, such as synthetic resin called ZEONEX 340R of Zeon Corporation as a material of the translucent resin covering the photodiode. However, such synthetic resin is expensive as compared to the synthetic resin material generally used for the photodetector for DVD, and therefore, unfortunately a price of an optical pickup apparatus cannot be reduced.

SUMMARY OF THE INVENTION

A photodetector according to an aspect of the present invention, comprises: a substrate; a photodiode fixed to the substrate, the photodiode configured to output a signal according to a light amount of a laser beam when applied with the laser beam; and a translucent resin covering the photodiode, the translucent resin being irradiated with ultraviolet light in advance for a predetermined time such that a change in transmittance of the translucent resin for the laser beam having a predetermined wavelength is set within a predetermined range.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

In an embodiment according to the present invention, in a photodetector including a photodiode covered with a translucent resin of a synthetic resin material configured to be applied with a laser beam reflected from a signal recording layer of an optical disc, which signal recording layer is applied with a laser beam emitted from a laser diode, and to output a signal according to a light amount of the applied laser beam, the degree of change in transmittance of the translucent resin for a blue-violet laser beam in accordance with accumulative irradiation of the blue-violet laser beam is set to be smaller by irradiating the translucent resin with ultraviolet light, as compared to the degree of change in the transmittance of the translucent resin not irradiated with the ultraviolet light. Therefore, a change is restrained in the transmittance of the translucent resin for the laser beam with a predetermined wavelength.

In an embodiment according to the present invention, if the photodetector is used as a photodetector generating a focus error signal by an astigmatic method, a thickness of the translucent resin provided on the photodiode in a direction of incidence of the laser beam is set to be smaller than a moving distance of a focal point to be moved in the direction of incidence from the focal point (point b in FIG. 3) in accordance with an operation of generating the focus error signal.

In an embodiment according to the present invention, in a laser-output controlling photodetector including the photodiode covered with a translucent resin of the synthetic resin material configured to be applied with the laser beam emitted from the laser diode and to generate a signal for performing a laser-output control operation for the laser diode according to a light amount of the applied laser beam, the degree of change in the transmittance of the translucent resin for the blue-violet laser beam in accordance with accumulative irradiation of the blue-violet laser beam is set to be smaller by irradiating the translucent resin with the ultraviolet light, as compared to the degree of change in the transmittance of the translucent resin unirradiated with the ultraviolet light.

In an embodiment according to the present invention, the ultraviolet light generated from an ultraviolet light irradiation device is applied so as to set the degree of change in the transmittance of the translucent resin for the blue-violet laser beam within the predetermined range.

In an embodiment according to the present invention, since the degree of change in the transmittance of the translucent resin of the synthetic resin material for the blue-violet laser beam is set within the predetermined range by irradiating the translucent resin thereof provided so as to cover the photodiode with the ultraviolet light for the predetermined time, there becomes usable an inexpensive synthetic resin, and thus, a significant effect is exerted on price reduction of optical pickup apparatuses. The inexpensive synthetic resin was unusable since the degree of change in the transmittance of the translucent resin for the blue-violet laser beam in accordance with the accumulative irradiation of the blue-violet laser beam is out of a specification for the translucent resin of the photodetector to be applied with the blue-violet laser beam.

Figure 2:
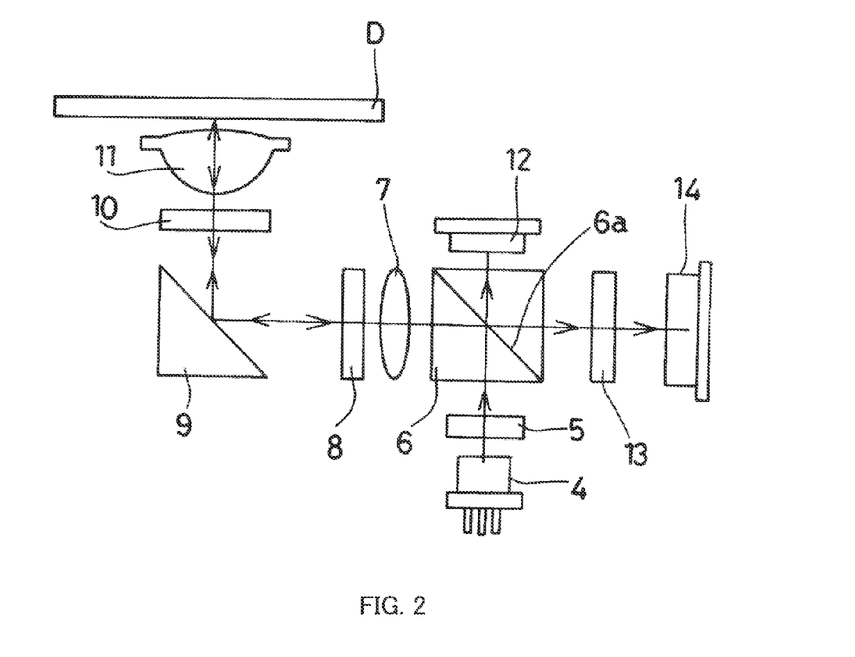
FIG. 2 is a principal part configuration view of a an optical pickup apparatus including a photodetector according to one embodiment of the present invention.

A configuration of an optical pickup apparatus including the photodetector of an embodiment according to the present invention will be described with reference to FIG. 2. In FIG. 2, reference numeral 4 denotes a laser diode that emits a blue-violet laser beam, and reference numeral 5 denotes a diffraction grating that the laser beam emitted from the laser diode 4 enters and that divides the laser beam into 0th order light, +1st order diffracted light, and −1st order diffracted light.

Reference numeral 6 denotes a polarizing beam splitter that the laser beam emitted from the diffraction grating 5 enters and reflected light from an optical disc D, which will be described later, enters, and that is provided with a control film 6a allowing incident laser beam to pass therethrough or reflecting the laser beam. Reference numeral 7 denotes a collimating lens that the laser beam reflected from the polarizing beam splitter 6 enters and that converts the incident laser beam into parallel light.

Reference numeral 8 denotes a phase change member that the laser beam converted into parallel light by the collimating lens 7 enters and that selectively changes a phase of the incident laser beam by ½λ (λ indicates a wavelength). The phase change member can be so configured as to change the phase by controlling a supply operation of a power source with the use of liquid crystal to change alignment direction of liquid crystal molecules, for example. The phase change member 8 not only changes the phase of the laser beam emitted from the laser diode 4 to convert the incident P-polarized light into the S-polarized light, but also sets an effective light flux diameter of the laser beam.

Reference numeral 9 denotes a reflective mirror that changes a direction of the laser beam having passed through the phase change member 8 toward the signal surface of the disc D, and that also reflects the reflected light reflected by the disc D in the direction of the phase change member 8. Reference numeral 10 denotes a hologram element that the laser beam reflected by the reflective mirror 9 enters, and that diffracts the laser beam depending on the phase of the incident laser beam, so as to allow the incident laser beam to pass therethrough, as it is, in the case of the P-polarized light, and so as to diffract the laser beam in the case of the S-polarized light.

Reference numeral 11 denotes an objective lens that the laser beam having passed through the hologram element 10 enters and that focuses the incident laser beam onto the signal recording layer of the optical disc D. In such a configuration, when the laser beam of the P-polarized light having an effective light flux diameter set by the phase change member 8 is made incident on the hologram element 10, a numerical aperture of the objective lens 11 is set at 0.85, and when the laser beam of the S-polarized light having an effective light flux diameter set by the phase change member 8 is made incident on the hologram element 10, the numerical aperture of the objective lens 11 is set at 0.65.

Therefore, if the optical disc D is a Blu-ray standard optical disc, the laser beam emitted from the laser diode 4 is guided to the hologram element 10 as a laser beam of the P-polarized light having an effective light flux diameter set by the phase change member 8 to set the numerical aperture of the objective lens 11 to 0.85, and thus, an operation of reading signals recorded in the optical disc D can be performed.

If the optical disc D is a HD-DVD standard optical disc, the laser beam emitted from the laser diode 4 is guided to the hologram element 10 as a laser beam of the S-polarized light having an effective light flux diameter set by the phase change member 8 to set the numerical aperture of the objective lens 11 to 0.65, and thus, the operation of reading signals recorded in the optical disc D can be performed.

The signal reading operation of the optical pickup apparatus is performed as above and there will then be described that is a photodetector used for a control operation for a laser output and a focusing control operation and a tracking control operation of the optical pickup apparatus.

In FIG. 2, reference numeral 12 is a laser-output controlling photodetector disposed at a position where a portion of the laser beam emitted from the laser diode 4 and having passed through the control film 6a included in the polarizing beam splitter 6 impinges, and the photodetector includes a photodiode therein. Such a laser-output controlling photodetector 12 is configured to generate a signal according to a light amount of the incident laser beam, and the laser output control operation, i.e., a laser servo operation can be performed by returning the signal obtained as above to a laser drive circuit.

In the above optical pickup apparatus, the laser beam reflected from the optical disc D is made incident on the polarizing beam splitter 6 through the objective lens 11, the hologram element 10, the reflective mirror 9, the phase change member 8, and the collimating lens 7, and such a laser beam passes through the control film 6a, as it is, without being reflected thereby.

Figure 3:
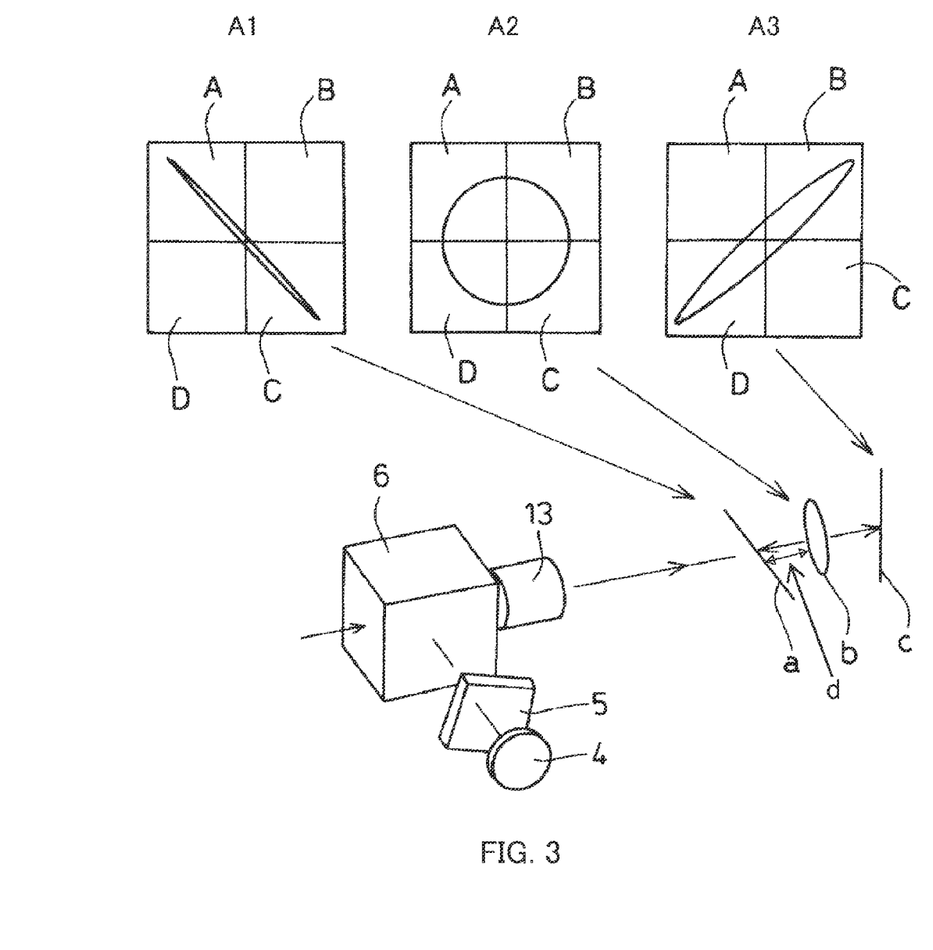
FIG. 3 is a schematic view of an optical pickup apparatus including a photodetector according to one embodiment of the present invention.

Reference numeral 13 denotes a sensor lens (astigmatic lens) disposed at a position where the reflected light from the optical disc D having passed through the polarizing beam splitter 6 impinges. The sensor lens 8 generates astigmatism for performing the focusing control operation by using an astigmatic method and guides the laser beam to the photodetector 14. The photodetector 14 includes a photodiode P to which the laser beam focused by the sensor lens 13 is applied, and the photodiode P called a four-divided sensor is made up of four light-receiving portions A, B, C, and D as shown in FIG. 3. The photodetector 14 having such a configuration is configured to be an integrated circuit and is generally referred to as PDIC.

Figure 1:
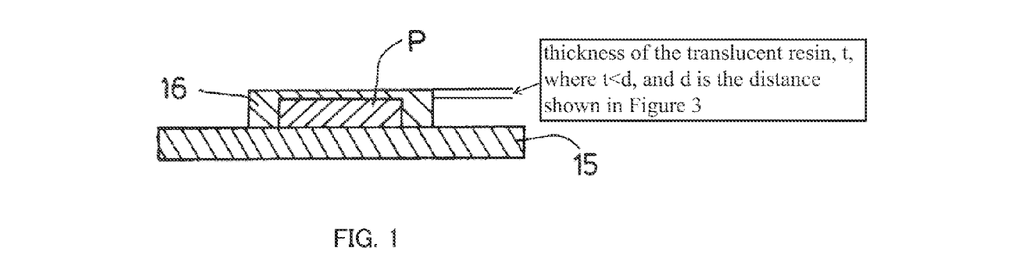
FIG. 1 is a cross-sectional view of a photodetector according to one embodiment of the present invention.

An embodiment according to the present invention has a significant effect when implemented for the photodetector 14 included in the optical pickup having a configuration described above, and will be described with reference to FIGS. 1, 3, and 4.

The photodetector according to an embodiment of the present invention includes the photodiode P fixed to the substrate 15 outputting a signal according to the light amount of the applied laser beam, and the photodiode P is covered with a translucent resin 16 having high transmittance for laser beam with a wavelength to be used, as shown. Signals generated by the photodiode Pare derived through the bonded wires (not shown), and such wires protecting operation and a wire fixing operation are performed with the translucent resin 16.

The translucent resin 16 of the photodetector 14 according to an embodiment according to the present invention is made from a synthetic resin material, for example, a cyclic olefin polymer resin such as above APEL 5014DP, and such a material is the same as a material used for objective lenses for performing a focusing operation of a red laser beam with a wavelength of 650 nm corresponding to the DVD-standard optical discs, for example.

The ultraviolet light with a wavelength of 360 nm emitted from the ultraviolet light irradiation device such as a mercury xenon lamp is applied to a whole area or laser beam incident surface of the translucent resin 16 of the photodetector 14 which is made of such a synthetic resin material. The application time (irradiation time) of the ultraviolet light to the translucent resin 16 is, for example, about 50 minutes, and it is confirmed that the initial transmittance of the translucent resin 16 for the blue-violet laser beam, i.e., a laser beam with a wavelength of 405 nm is reduced to about 95.7% by performing such an applying operation.

Figure 4:
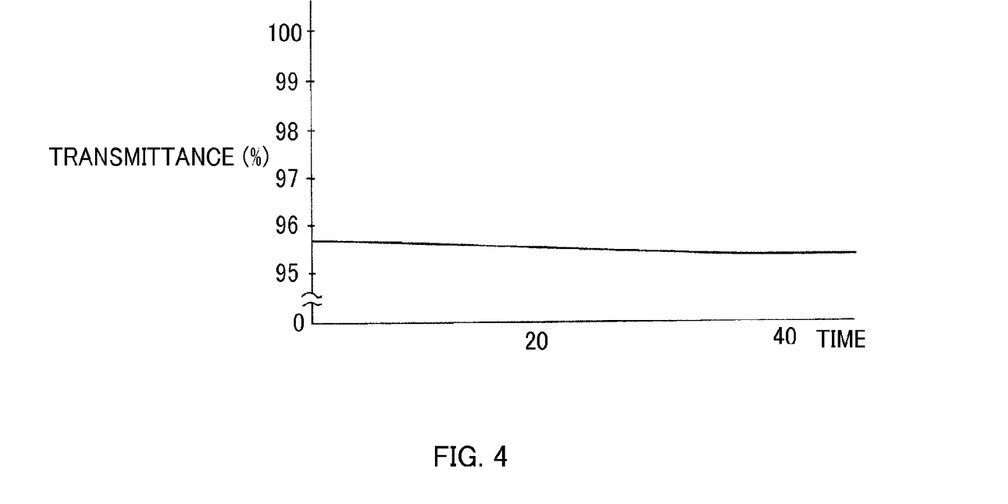
FIG. 4 is a characteristic view showing a relationship between transmittance of a translucent resin and irradiation time in a photodetector according to one embodiment of the present invention.

FIG. 4 shows a relationship between the application time and the transmittance when the blue-violet laser beam, i.e., the laser beam with a wavelength of 405 nm is applied to the translucent resin 16 having the transmittance reduced to be set to about 95.7% by an above described method, i.e., by applying the ultraviolet light with a wavelength of 360 nm emitted from the mercury xenon lamp. As seen from such a characteristic view, the transmittance is stable at 95.3% after a lapse of about 40 hours, and it is experimentally confirmed that a change in the transmittance can be restrained within a range of substantially 1%. That is, after irradiation with the ultraviolet light from the ultraviolet light irradiation device, the degree of change in the transmittance of the translucent resin 16 for the blue-violet laser beam over time is significantly reduced.

Therefore, by applying the ultraviolet light to the translucent resin 16 made of the same synthetic resin material as that used for objective lenses for performing the focusing operation of the red laser beam with a wavelength of 650 nm corresponding to the DVD-standard optical discs, the translucent resin 16 can be used without trouble as the translucent resin 16 allowing the blue-violet laser beam, i.e., the laser beam with a wavelength of 405 nm used for performing a reproducing operation and a recording operation for signals recorded in the Blu-ray standard optical disc D, to be applied to the photodiode P.

Figure 5:
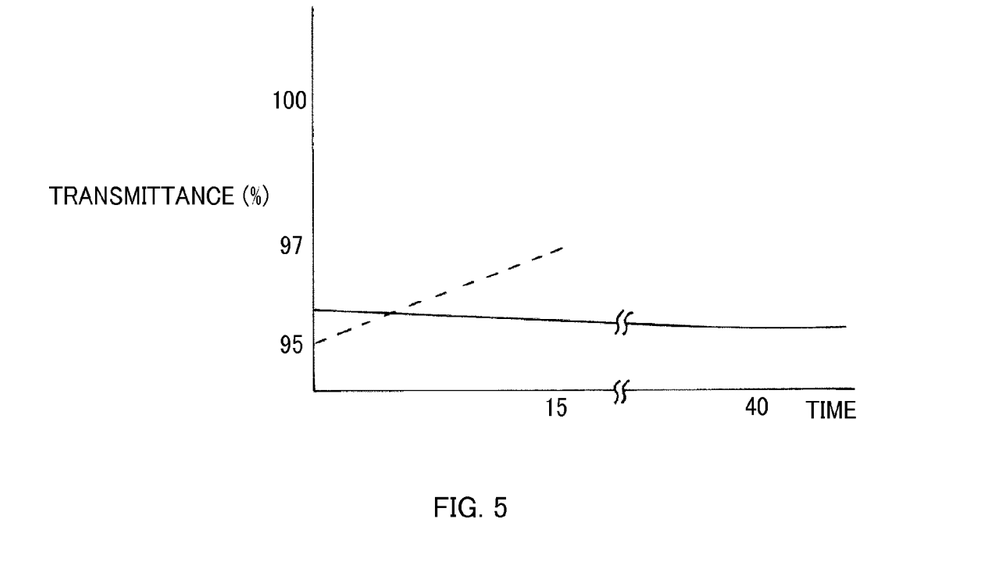
FIG. 5 is a characteristic view for explaining a manufacturing method of a photodetector according to one embodiment of the present invention.

A characteristic view shown in FIG. 5 represents relationship between the application time and the transmittance when the blue-violet laser beam with a wavelength of 405 nm is applied to the translucent resin 16 with different application time of the ultraviolet light emitted from the mercury xenon lamp. In FIG. 5, transmittance of 100% indicates transmittance of the translucent resin 16 that is made of the synthetic resin material same as the material used for objective lenses for performing the focusing operation of the red laser beam with a wavelength of 650 nm when no ultraviolet light is applied thereto, for the blue-violet laser beam with a wavelength of 405 nm.

In FIG. 5, a characteristic indicated by a solid line represents a change in the transmittance of the translucent resin 16 to which the ultraviolet light with a wavelength of 360 nm emitted from the mercury xenon lamp has been applied for about 50 minutes as above. It can be seen from this characteristic that the initial transmittance of the translucent resin 16 is reduced to be set to about 95.7% by the application of the ultraviolet light and that the transmittance of the translucent resin 16 is reduced to be stabilized at 95.3% after a lapse of 40 hours of the application time of the blue-violet laser beam.

In FIG. 5, a characteristic indicated by a broken line represents a change in the transmittance of the translucent resin 16 to which the ultraviolet light with a wavelength of 360 nm emitted from the mercury xenon lamp has been applied for about 7 minutes. It can be seen from this characteristic that the initial transmittance of the translucent resin 16 is reduced to be set to about 95% by the application of the ultraviolet light and that the transmittance of the translucent resin 16 is increased to 97% after a lapse of 15 hours of the application time of the blue-violet laser beam. That is, in the translucent resin 16 having been subjected to the ultraviolet light for about 7 minutes, the transmittance thereof is changed by 2% or more according to the application time of the blue-violet laser beam, and thus, it may be a problem to use such translucent resin as the translucent resin 16 of the optical pickup apparatus.

The transmittance of the translucent resin 16 for the blue-violet laser beam can be changed according to the application condition of the ultraviolet light as described above, and an initial set value and a variation characteristic of the transmittance can be set to various values by adjusting the application time of the ultraviolet light. That is, in an embodiment described above, the application time of the ultraviolet light is set to about 50 minutes, and the initial transmittance of the translucent resin 16 for the laser beam with a wavelength of 405 nm is set to about 95.7%. In an embodiment described above, a transmittance setting operation is performed by applying to the translucent resin 16 the ultraviolet light emitted from the mercury xenon lamp, and the mercury xenon lamp has a characteristic that spectral intensity and width are great and a spectrum including an emission line group is broad in the ultraviolet region. Therefore, the applying operation is required to be performed with accuracy in order to obtain a highly accurate translucent resin 16.

FIG. 3 shows changes in shape of a laser spot applied to the four light-receiving portions A, B, C, and D included in the photodetector 14 when the objective lens 11 is displaced in a direction perpendicular to the signal surface of the optical disc D in order to perform the focusing control operation.

As described above, there is set the transmission characteristics in the case of irradiating the translucent resin 16 with the ultraviolet light having a wavelength of 360 nm generated from the mercury xenon lamp.

In FIG. 3, A1 shows a shape of the laser spot applied to the light-receiving portions A, B, C, and D when the laser beam is focused to a position called front focus; A2 shows a shape of the laser spot applied to the light-receiving portions A, B, C, and D when the laser beam is focused on the signal recording layer of the optical disc D, i.e., in a focused state; A3 shows a shape of a spot of the laser beam applied to the light-receiving portions A, B, C, and D when the laser beam focused to a position called rear focus.

If the objective lens 11 is moved in the focusing control directions relative to the signal surface of the optical disc D, the laser spot applied to the light-receiving portions A, B, C, and D as above is changed from A1 to A3 or A3 to A1. Therefore, a focus error signal FE can be obtained such that a signal obtained from the light-receiving portion A is added to a signal obtained from the light-receiving portion C to obtain a signal E, a signal obtained from the light-receiving portion B is added to a signal obtained from the light-receiving portion D to obtain a signal F, and then the above obtained signal F is subtracted from the above obtained signal E.

The displacement position of the objective lens 11 can be controlled by supplying a focus coil for controlling a position of the objective lens 11 with a control signal so that a value of the above obtained focus error signal FE results in zero, and therefore, there can be performed the operation of focusing as a spot the laser beam generated by the focusing operation of the objective lens 11 onto the signal recording layer of the optical disc D, i.e., the focusing control operation.

The laser spot applied onto the light-receiving portions A, B, C, and D is changed from A1 to A3 through an displacement operation of the objective lens 11 in a focusing direction as described above, and in this case, the laser beam focused by the sensor lens 13 is focused to positions indicated by a, b, and c of FIG. 3. That is, the focal point of the laser beam focused by the sensor lens 13 is moved between the point a and the point c in accordance with the displacement of the objective lens 11. The points a and c indicate the focal points of the laser beam from the sensor lens 13 when the laser beam is focused on the signal recording layer of the optical disc D, and the point b indicates the focal point of the laser beam from the sensor lens 13 when the laser beam is not focused on the signal recording layer.

The focal point of the laser beam focused by the sensor lens 13 is moved between the point a and the point c as above, and when light intensities at the focal points are compared, the intensity is maximum at the point a and the point c and the intensity is minimized at the point b. The laser beam used for the focusing control operation is applied to the photodiode P through the translucent resin 16. Therefore, If a thickness of the translucent resin 16 provided on the photodiode in the direction of incidence of the laser beam is greater than a distance between the point a (second focal point) and the point b (first focal point), which is the focused position, the light intensity applied to the translucent resin 16 is increased at the point a.

As a result, an effect from the laser beam is increased on the translucent resin 16, and this leads to a problem that the transmission characteristics are deteriorated. Therefore, in an embodiment according to the present invention, the thickness of the translucent resin 16 provided on the photodiode in the direction of incidence direction of the laser beam is set to be smaller than the distance between the point a and the point b, which is the focal point. With a configuration described above, the effect from the laser beam is reduced on the translucent resin 16 and the deterioration of the transmission characteristics can be restrained.

While the thickness of the translucent resin 16 is set as above, specifically, many optical pickup apparatuses are designed such that the distance between the points a and b is about 0.6 mm, and thus, the thickness of the translucent resin 16 is set to 0.1 to 0.2 mm.

While the initial transmittance of the translucent resin 16 can be set to a desired value by applying the ultraviolet light from the ultraviolet light irradiation device to the translucent resin 16 made of the synthetic resin for a predetermined time as described above, the initial transmittance can be set based on the intensity and the application time of the ultraviolet light. That is, since the application time is considerably changed in accordance with a radiant heat quantity of the ultraviolet light applied to the translucent resin 16, there is significantly reduced the degree of change in the transmittance of the translucent resin 16 for the blue-violet laser beam after irradiation with the ultraviolet light from the ultraviolet light irradiation device, by appropriately setting the intensity and irradiation time of the ultraviolet light, and thus, the transmittance of the translucent resin 16 can be set within the predetermined range based on the specification of the translucent resin 16.

Although in an embodiment of the present invention, a description has been made for a case of implementing an embodiment in the photodetector 14 used for the focusing control operation as a photodetector, an embodiment may also be implemented in the laser-output controlling photodetector 12 used for controlling an output of the laser beam. In this case, the synthetic resin material having characteristics suitable for the red laser beam, such as APEL 5014DP of Mitsui Chemicals, inc., is used as the translucent resin covering the photodiode of the laser-output controlling photodetector 12, to be irradiated with the ultraviolet light from the ultraviolet light irradiation device, so that the degree of change in the transmittance of the translucent resin for the blue-violet laser beam is set within the predetermined range.

APEL 5014DP used as a material of the translucent resin 16 covering the photodiode P of the photodetector 14 according to an embodiment of the present invention has a refractive index of 1.5434 for d line (emission line of Na lamp which is a laser beam having a wavelength of 587.6 nm) at 25 degrees Celsius and a refractive index of 1.5575 for the blue-violet laser beam having a wavelength of 405 nm.

On the other hand, ZEONEX 340R, which is the synthetic resin material suitable for the blue-violet laser beam as to an optical characteristic of the degree of change in the transmittance of the synthetic resin for the blue-violet laser beam in accordance with accumulative irradiation of the blue-violet laser beam, has a refractive index of 1.509 for d line at 25 degrees Celsius, and a refractive index of 1.5215 for the blue-violet laser beam having a wavelength of 405 nm. That is, since APEL 5014DP has a refractive index greater than ZEONEX 340R, APEL 5014DP has an advantage that the radius of curvature of a lens can be increased in the case where the translucent resin covering the photodiode of the photodetector have a function of a lens.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
a laser diode configured to generate a laser beam;
an objective lens;
a photodetector comprising:
  a substrate;
  a photodiode fixed to the substrate, the photodiode configured to output a signal according to a light amount of reflected light when applied with the reflected light reflected from a signal recording layer of an optical disc after the laser beam is applied to the signal recording layer thereof; and
  a translucent resin covering the photodiode, wherein the photodiode is prepared using a method comprising applying ultraviolet light to the translucent resin for a predetermined time in order to reduce a transmittance of the translucent resin to a level at which any further change to the transmittance caused by an application of the laser beam to the translucent resin is constrained to within a predetermined range; and
an astigmatic lens configured to:
  apply the reflected light through the astigmatic lens onto the photodiode, and
  focus the reflected light at a focal point that changes position as the objective lens moves in a focusing direction, wherein:
    a first position of the focal point of the reflected light corresponds to a first focus position of the objective lens, the objective lens focusing the laser beam outside of the signal recording layer of the optical disc;
    a second position of the focal point of the reflected light corresponds to a second focus position of the objective lens, the objective lens focusing the laser beam onto the signal recording layer of the optical disc; and
    a thickness of the translucent resin in a direction of incidence of the reflected light on the photodiode is less than a distance between the first position of the focal point of the reflected light and the second position of the focal point of the reflected light.

2. The optical pickup apparatus of claim 1, wherein the first position of the focal point of the reflected light is closer to the objective lens than the second position of the focal point of the reflected light.

* * * * *